(12) United States Patent
Valera et al.

(10) Patent No.: US 9,946,069 B2
(45) Date of Patent: Apr. 17, 2018

(54) DISPLAYS

(71) Applicant: BAE SYSTEMS plc, London (GB)

(72) Inventors: Mohmed Salim Valera, Chatham Kent (GB); Michael David Simmonds, Rochester Kent (GB); Maha Fares, Rochester Kent (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/780,268

(22) PCT Filed: Mar. 25, 2014

(86) PCT No.: PCT/GB2014/050942
§ 371 (c)(1),
(2) Date: Sep. 25, 2015

(87) PCT Pub. No.: WO2014/155096
PCT Pub. Date: Oct. 2, 2014

(65) Prior Publication Data
US 2016/0041387 A1    Feb. 11, 2016

(30) Foreign Application Priority Data

Mar. 28, 2013  (EP) ..................................... 13275083
Mar. 28, 2013  (GB) ................................... 1305691.6

(51) Int. Cl.
G02B 27/01     (2006.01)
G02B 27/00     (2006.01)
(Continued)

(52) U.S. Cl.
CPC ......... *G02B 27/0101* (2013.01); *G02B 6/005* (2013.01); *G02B 6/0031* (2013.01);
(Continued)

(58) Field of Classification Search
CPC .............. G02B 27/0101; G02B 6/0031; G02B 6/0053; G02B 6/0055; G02B 6/0056;
(Continued)

(56) References Cited

U.S. PATENT DOCUMENTS 4,711,512 A  * 12/1987 Upatnieks .......... G02B 27/0103
                                                        345/7
4,968,117 A  * 11/1990 Chern ...................... B01J 12/02
                                                        359/573
(Continued)

FOREIGN PATENT DOCUMENTS

EP     1385023 A1    1/2004
EP     1748305 A1    1/2007
(Continued)

OTHER PUBLICATIONS

International Preliminary Report on Patentability received for Patent Application No. PCT/GB2014/050942, dated Oct. 8, 2015. 9 pages.

(Continued)

*Primary Examiner* — Peter Radkowski
(74) *Attorney, Agent, or Firm* — Finch & Maloney PLLC (57) ABSTRACT

An optical component for a display apparatus comprises an optical waveguide part (11) arranged to guide light therealong between surface parts thereof by internal reflection, an input part (13) arranged to receive light and direct the received light into the optical waveguide part, and an output part comprising a partially transmissive angularly reflective optical coating (25) arranged upon a surface part of the optical waveguide part. The output part is optically coupled to the input part by the optical waveguide part to receive guided light and to transmit some but not all of said guided light out from the optical waveguide part. The angularly reflective optical coating extends along a dimension of the optical waveguide part to expand the guided light in said (Continued)

dimension along the output part by repeated partial transmission thereof for output.

20 Claims, 4 Drawing Sheets (51) Int. Cl.
*F21V 8/00* (2006.01)
*G02B 5/04* (2006.01)
(52) U.S. Cl.
CPC ......... *G02B 6/0053* (2013.01); *G02B 6/0055* (2013.01); *G02B 6/0056* (2013.01); *G02B 27/0081* (2013.01); *G02B 27/0172* (2013.01); *G02B 5/045* (2013.01); *G02B 6/0018* (2013.01); *G02B 2027/0116* (2013.01); *G02B 2027/0125* (2013.01)
(58) Field of Classification Search
CPC ........ G02B 27/0081; G02B 2027/0116; G02B 2027/0125
See application file for complete search history.

(56) References Cited

U.S. PATENT DOCUMENTS

| | | | | |
|---|---|---|---|---|
| 5,013,632 A * | 5/1991 | Weber | ................... | G03F 7/001 430/1 |
| 5,071,210 A * | 12/1991 | Arnold | ................... | G02B 5/32 359/15 |
| 5,166,813 A * | 11/1992 | Metz | ................... | G01N 21/6428 250/458.1 |
| 5,194,989 A * | 3/1993 | Ferrante | ............. | C03C 17/3417 359/583 |
| 5,198,928 A * | 3/1993 | Chauvin | ............ | G02B 27/0172 348/E13.038 |
| 5,337,328 A * | 8/1994 | Lang | ................... | H01S 5/1032 372/102 |
| 5,684,634 A * | 11/1997 | Rogers | ............... | G02B 27/0101 359/630 |
| 5,877,874 A * | 3/1999 | Rosenberg | ................ | F24J 2/06 136/246 |
| 5,986,746 A * | 11/1999 | Metz | ................... | A61B 5/1172 356/71 |
| 6,115,152 A * | 9/2000 | Popovich | ................. | G02B 5/32 353/30 |
| 6,839,173 B2 * | 1/2005 | Shimmo | ............... | G02B 5/1861 359/569 |
| 7,643,214 B2 * | 1/2010 | Amitai | ............... | G02B 27/0081 359/618 |
| 8,189,263 B1 * | 5/2012 | Wang | ................. | G02B 27/0172 359/630 |
| 8,665,178 B1 * | 3/2014 | Wang | ................. | G02B 27/0172 345/7 |
| 2002/0044359 A1 * | 4/2002 | Shimmo | ............. | G02B 5/1861 359/572 |
| 2004/0032659 A1 * | 2/2004 | Drinkwater | ........... | F21V 33/006 359/558 |
| 2005/0270604 A1 * | 12/2005 | Drinkwater | ........... | F21V 33/006 359/2 |
| 2006/0132914 A1 * | 6/2006 | Weiss | ...................... | G02B 5/32 359/462 |
| 2008/0151379 A1 | 6/2008 | Amitai | | |
| 2008/0152379 A1 * | 6/2008 | Saiki | ...................... | G03G 21/12 399/106 |
| 2008/0198471 A1 * | 8/2008 | Amitai | ............... | G02B 27/0081 359/630 |
| 2009/0190222 A1 * | 7/2009 | Simmonds | ........... | G02B 6/0028 359/567 |
| 2010/0067110 A1 * | 3/2010 | Hadad | ..................... | G02B 6/00 359/485.06 |
| 2010/0111472 A1 * | 5/2010 | DeJong | ............. | G02B 27/0081 385/31 |
| 2010/0214659 A1 * | 8/2010 | Levola | ................. | G02B 5/1814 359/566 |
| 2011/0267702 A1 * | 11/2011 | Fujimoto | ........... | G02B 27/0101 359/633 |
| 2012/0019923 A1 * | 1/2012 | Niesten | .................... | G02B 5/26 359/630 |
| 2012/0044572 A1 * | 2/2012 | Simmonds | ........... | G02B 6/0038 359/630 |
| 2013/0021224 A1 * | 1/2013 | Fujikawa | ........... | G02B 27/0101 345/7 |

FOREIGN PATENT DOCUMENTS

| | | |
|---|---|---|
| EP | 2244112 A1 | 10/2010 |
| WO | 2009083977 A2 | 7/2009 |
| WO | 2014155096 A1 | 10/2014 |

OTHER PUBLICATIONS

International Search Report and Written Opinion received for Patent Application No. PCT/GB2014/050942, dated May 23, 2014. 13 pages.
GB Intellectual Property Office Search Report under Section 17(5) received for GB Patent Application No. 1305691.6 dated Sep. 3, 2013. 4 pages.
Extended European Search Report received from EP Patent Application No. 13275083.7 dated May 28, 2013. 4 pages.

* cited by examiner

DISPLAYS

FIELD OF THE INVENTION

The invention relates to a component for a display, and to a display apparatus as well as a method for providing an optical display such as an optical display employing an optical waveguide. In particular, the invention is relevant to a display device in which image-bearing light is injected into a waveguide and is subsequently released from the waveguide for viewing, for example a helmet-mounted or head-up display device. In such devices, image-bearing light may be focussed at infinity.

BACKGROUND

Figure 1:
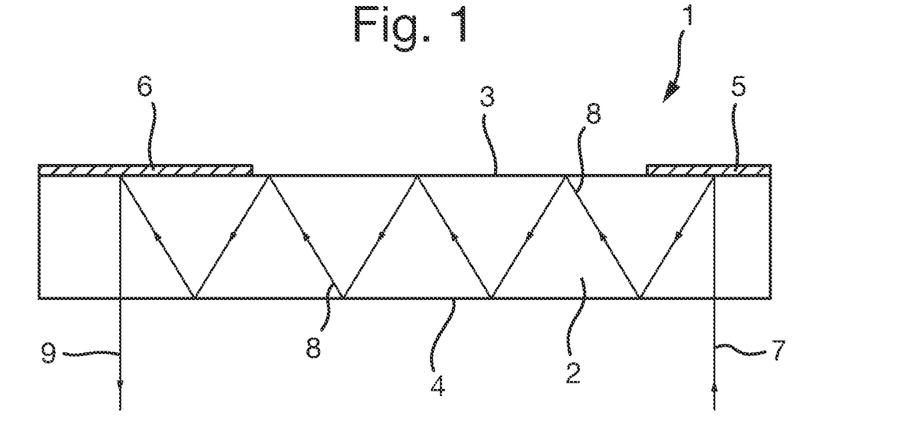
FIG. 1 shows a prior art optical component for a display.

Optical waveguides for display devices of this type typically release guided light from an output part by a process of diffraction for viewing, whereby guided light is diffracted within the waveguide to a direction which prohibits total internal reflection thereby rendering the waveguide no longer able to retain the guided light within it. Such light simply exits the waveguide without further propagation within the waveguide, and is thereby visible to a viewer. A reversal of this process forms the means for diffractively injecting light into such a waveguide to a direction which enables total internal reflection within the waveguide for guided propagation therealong towards an output part of the waveguide. FIG. 1 schematically shows an example of this.

A planar (e.g. slab) waveguide 2 provides flat opposite surfaces (3, 4) for guiding light rays 8 along the waveguide between the opposing surfaces by successive total internal reflection (TIR) at alternate surfaces internally. An input 7 light ray is directed into the waveguide at a low angle of incidence which is insufficiently oblique to either of the opposing surfaces of the waveguide to permit TIR there. An input diffraction grating 5 is positioned upon a surface of the waveguide to receive the input light and to diffract the received ray in a direction forming an angle of incidence to the opposite surfaces of the waveguide internally which permits TIR. Guiding of the light ray 8 ensues until the guided light is incident upon an output diffraction grating 6 arranged upon the same surface 3 of the waveguide bearing the input grating 5. The output grating diffracts the received ray in a direction forming an angle of incidence to the opposite surface 4 of the waveguide internally which does not permit TIR, and light ray 9 is output from the waveguide for viewing.

However, the diffraction gratings typically used to implement this input/output process are inherently dispersive thus limiting the field of view (FOV) and the colour bandwidth available from such waveguides. As an example, a full colour image consisting of red, green and blue light, having a 35 degrees FOV may be injected into a diffractive grating waveguide. The input diffraction grating can only be optimised for one particular colour. Thus, if the input diffraction grating is optimised for green light, a substantial portion of the red light will fail to diffract as desired (diffraction will be evanescent) while a substantial portion of the blue light will be diffracted to an angle which fails to provide the total internal reflection required within the waveguide and thus fails to reach the eye of the user.

The invention desirably provides means and methods which may be used to alleviate this.

SUMMARY OF THE INVENTION

At its most general, the invention implements an output (and preferably also an input) of guided light from a waveguide based on the principle of reflection rather than diffraction. Output of guided light is achieved by partial transmissions of the light through a surface of the waveguide which is prepared in such a way (e.g. bears an angularly reflective optical coating) as to inhibit TIR there but to supports partial internal reflection and partial transmission. In this way, successive interactions of the guided light with the prepared surface, as partially reflected rays continue to be guided along the waveguide, enables successive partial transmissions of light from the rays thereby expanding the output light in the direction of internal propagation along the waveguide.

In a first aspect, the invention may provide an optical component for a display apparatus comprising: an optical waveguide part arranged to guide light therealong between surface parts thereof by internal reflection thereat; an input part arranged to receive light and direct the received light into the optical waveguide part; and, an output part comprising a partially transmissive angularly reflective optical coating arranged upon a said surface part of the optical waveguide part and optically coupled to the input part by the optical waveguide part to receive said guided light and to transmit some but not all of said guided light out from the optical waveguide part; wherein the angularly reflective optical coating extends along a dimension of the optical waveguide part to expand the guided light in said dimension along the output part by repeated partial transmission thereof for output. The output part may include a prism in optical contact with the said transmissive angularly reflective optical coating part arranged to receive light from the said waveguide part and to direct the received light out of the optical waveguide part.

In this manner, the angularly reflective optical coating can be arranged to reflect a substantial portion of the light incident on it at relatively high angles of incidence and to transmit a substantial portion of light incident on it at relatively low angles of incidence. It will be understood that the angularly reflective optical coating may also transmit a small portion of light incident on it at relatively high angles of incidence.

The output part may include an output reflector part optically coupled to the angularly reflective optical coating for receiving said transmitted light from the angularly reflective optical coating and reflecting the transmitted light in a direction through surface parts of the waveguide part for output. The reflector part may be formed on a surface of the prism which is inclined to the waveguide part.

The angularly reflective optical coating may comprise a single dielectric layer of a refractive index lower than the refractive index of the waveguide part, or may comprise a plurality of successive dielectric layers of relatively high and low respective refractive indices. For example, the angularly reflective optical coating may comprise a layer of low refractive index (e.g. silicon dioxide) upon which is formed a layer of higher refractive index (e.g. titanium dioxide). This structure may be repeated to form a multi-layer stack or laminate of a plurality of lower refractive index layers each separated by a higher refractive index layer. The number of layers, the thickness of the layers and the refractive indices of each layer may be selected by the user to achieve the desired level of reflectivity/transmissivity in the overall angularly reflective optical coating according to established techniques of multi-layer coating design as would be readily available to the skilled person.

The input part is preferably arranged to direct light into the optical waveguide part to an angle of incidence sufficiently oblique to a said surface part as to totally internally reflect thereat wherein said angle of incidence is insufficiently oblique to totally internally reflect said light at said surface part along which said partially transmissive angularly reflective optical coating is arranged, thereby to enable transmission of some of said incident light therethrough.

The input part comprises an input reflector part for receiving light through surface parts of the optical waveguide part and for reflecting said light into the optical waveguide part to an angle of incidence sufficiently oblique to a said surface part as to totally internally reflect thereat for guided propagation along the optical waveguide part.

The output reflector part is preferably arranged to direct light through surface parts of the optical waveguide part at an angle of incidence insufficiently oblique to totally internally reflect said light thereat.

The output part and/or the input part may comprise a respective prism upon a surface of which is formed a reflective coating arranged to reflect light from the waveguide in a direction back through a surface part of the waveguide by reflection. This reflective coating may be metallic (e.g. silver) or a multi-layer dielectric.

The output part may comprise one or more partial reflector parts each embedded or encapsulated within the body of the prism in a position between the angularly reflective optical coating and the reflective coating to present a partially reflective surface which is substantially parallel to the separate reflective surface of the reflective coating. The partial reflector part(s) may comprise a metallic layer/coating or a dielectric layer or multiple dielectric layers (e.g. different dielectric layers forming a stack), or a combination of the aforesaid. The embedded/encapsulated partial reflector part(s) assist in reducing the overall size of the output prism. The embedding or encapsulation may be done by forming the prism from two parts joined or bonded at a surface upon which the partial reflectors are formed as a partially reflective layer or coating thereby to encapsulate the layer between the joined parts of the prism.

The output part and/or the input part may comprise a respective plurality of said prisms forming an array of prisms.

The angularly reflective optical coating preferably comprises a multi-layer coating. The multi-layer coating may be designed to possess the required reflection/transmission properties for the wave-guided light rays within the waveguide part in use, which are subject to TIR, but which simultaneously possesses a sufficiently high transmission of light rays which have been reflected back to the angularly reflective optical coating from the reflective coating of the output part (e.g. the reflector part(s) of the prism part), and have undergone an angular change in direction. The number of layers in the multi-layer, the thickness of the layers and the refractive indices of each layer may be selected by the user to achieve the desired level of reflectivity/transmissivity in the overall angularly reflective optical coating according to established techniques of multi-layer coating design as would be readily available to the skilled person.

The degree of partial transmission of the angularly reflective optical coating may be spatially graded (e.g. continuously or step-wise), so that less of incident light is transmitted (as a percentage of incident light) to the output prism part at the regions of the angular reflective optical coating closest to the input part where the first ray/coating interactions occur, and relatively more (as a percentage of incident light) is transmitted at the opposite end of the angularly reflective optical coating furthest from the input part where the last ray/coating interactions occur. The angularly reflective optical coating may be provided as a series of side-by-side strips of coating material having differently graded respective light transmission degrees/levels.

The output part may include a quarter (¼) wave plate arranged between the angularly reflective optical coating and the output reflector part arranged to transmit light from the optical waveguide part to the output reflector part and from the output reflector part to the optical waveguide part.

In a second aspect, the invention may provide a display apparatus including an optical component according to the invention in its first aspect.

In a third aspect, the invention may provide a method of manufacturing an optical component for a display apparatus comprising: providing an optical waveguide part including surface parts for guiding light therebetween by internal reflection thereat; providing an input part to receive light and to direct the received light into the optical waveguide part; providing an output part; applying a partially transmissive angularly reflective optical coating upon a said surface part to receive said guided light and to transmit some but not all of said guided light out from the optical waveguide part; and attaching the output part to the angularly reflective optical coating thereby optically coupling the output part to the angularly reflective optical coating for receiving transmitted light from the angularly reflective optical coating and outputting the light so received.

The output part may include a reflector for reflecting transmitted light received thereby from the angularly reflective optical coating in a direction through surface parts of the waveguide part for output. The output part may include one or more partial reflectors which are partially reflective and partially transmissive of light rays from the waveguide part. The method may include positioning the partial reflector(s) to be substantially parallel to the reflector such that light transmitted through a partial reflector is incident upon the reflector to be reflected thereby. The output part may be an optically transparent prism part, and the method may include forming the reflector as a reflective coating on a surface of the prism part. The method may include embedding the partial reflector(s) within the prism part. The method may include attaching the prism part to the waveguide part to cover at least some of the angularly reflective optical coating whereby the reflector coating and any partial reflector(s) are positioned to receive, in use, guided light transmitted through the angularly reflective optical coating and to reflect the received light back to the angularly reflective optical coating at an angle of incidence which does not support total internal reflection (TIR) within the waveguide part.

The method may include attaching a quarter (¼) wave plate between the angularly reflective optical coating and the output reflector part to transmit light from the optical waveguide part to the output reflector part and from the output reflector part to the optical waveguide part. The quarter wave plate may be attached to the angularly reflective optical coating (e.g. substantially parallel thereto). In alternative embodiments, the quarter wave plate may be positioned substantially parallel to the reflective coating, such as a reflective coating formed on a surface of a prism when the output part comprises a prism, at a location between the reflective coating and the angularly reflective optical coating. This location ensures that light emanating from the angularly reflective optical coating towards the reflective coating first passes through the quarter wave plate and upon reflection at the reflective coating is directed to pass through the quarter wave plate a second time as it approaches the angularly reflective optical coating and waveguide part for output. The result of two such passes through the quarter wave plate is ensure a 90 degree rotation in the plane of polarisation of a given light ray passing therethrough.

The quarter wave plate may be embedded of encapsulated within the prism to achieve this, in the manner of encapsulation described above, or may be placed at/across the hypotenuse of the prism, and an outer surface of the quarter wave plate may be coated with the reflective coating.

The angularly reflective optical coating formed upon the surface of the waveguide part (and the partial reflector(s), if employed) may be designed to partially reflect light of one selected polarisation state (e.g. S-state or P-state) and to optimally transmit light of the other polarisation state (e.g. P-state or S-state). In this way, light may be suitably reflected and suitably transmitted. The quarter wave plate may be placed such that it receives light from the partial reflector(s)—when employed—before reflection by the reflective coating such that a 90 degree polarisation orientation change (S-to-P, or vice versa) occurs after partial reflection and before subsequent transmission by the partial reflector(s). In alternative embodiments, a birefringent optical coating(s) may be provided upon surface of the reflective coating of the output part (e.g. prism) to achieve the effect of a quarter wave plate and provide the desired 90 degree polarisation orientation change (S-to-P, or vice versa).

In a fourth aspect, the invention may provide a method of displaying an image comprising: receiving light at an optical waveguide part and directing the received light into the optical waveguide part to guide light therealong between surface parts thereof by internal reflection thereat; receiving said guided light at an output part of the optical waveguide part comprising a partially transmissive angularly reflective optical coating arranged upon a said surface part of the optical waveguide part; and transmitting some but not all of said guided light out from the optical waveguide part through the angularly reflective optical coating; thereby expanding the guided light in a dimension of the optical waveguide part along which the angularly reflective optical coating extends by repeated partial transmission of guided light for output through the angularly reflective optical coating.

The method may include receiving said transmitted light from the angularly reflective optical coating at an output reflector and therewith reflecting the transmitted light in a direction through surface parts of the waveguide part for output A method may include receiving light through surface parts at an input reflector part and reflecting said light into the optical waveguide part to an angle of incidence sufficiently oblique to surface parts thereof as to totally internally reflect thereat for guided propagation therealong.

A method may include directing light into the optical waveguide part to an angle of incidence sufficiently oblique to said surface parts as to totally internally reflect thereat wherein said angle of incidence is insufficiently oblique to totally internally reflect said light at those parts of a said surface along which said partially transmissive angularly reflective optical coating is arranged, thereby to enable transmission of some of said incident light therethrough.

BRIEF DESCRIPTION OF THE DRAWINGS

A non-limiting example of a preferred embodiment of the invention now follows for the purposes of illustration, with reference to figures within the accompanying drawings of which.

DETAILED DESCRIPTION

In the drawings, like items are assigned like reference symbols for consistency.

Figure 2:
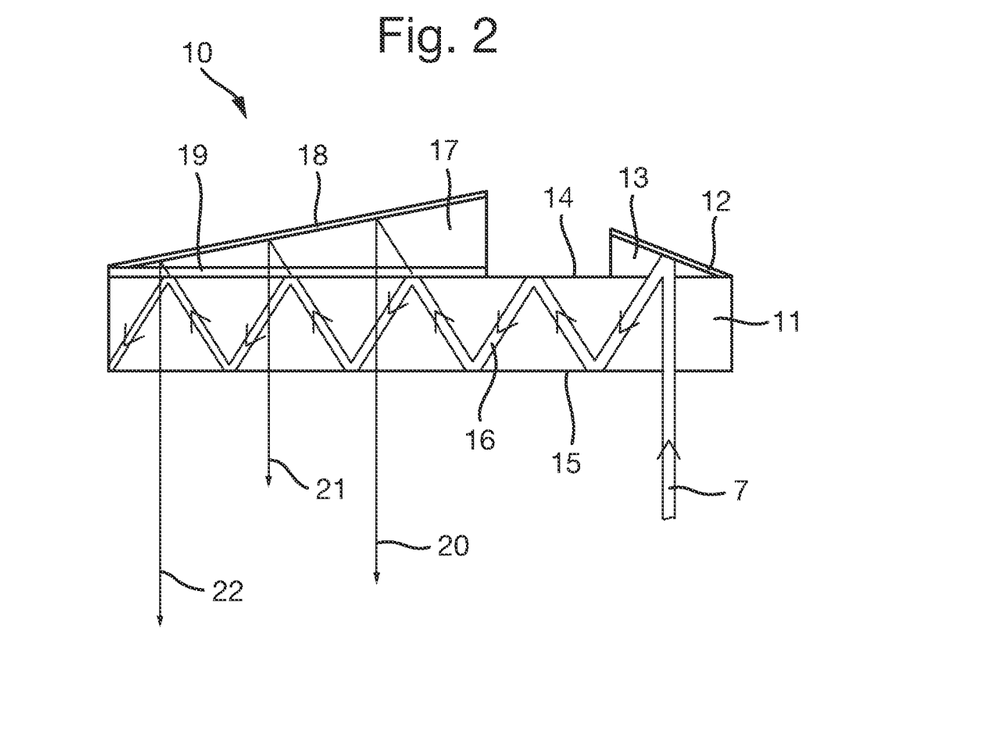
FIG. 2 shows an optical component for a display according to an embodiment of the invention.
Figure 7:
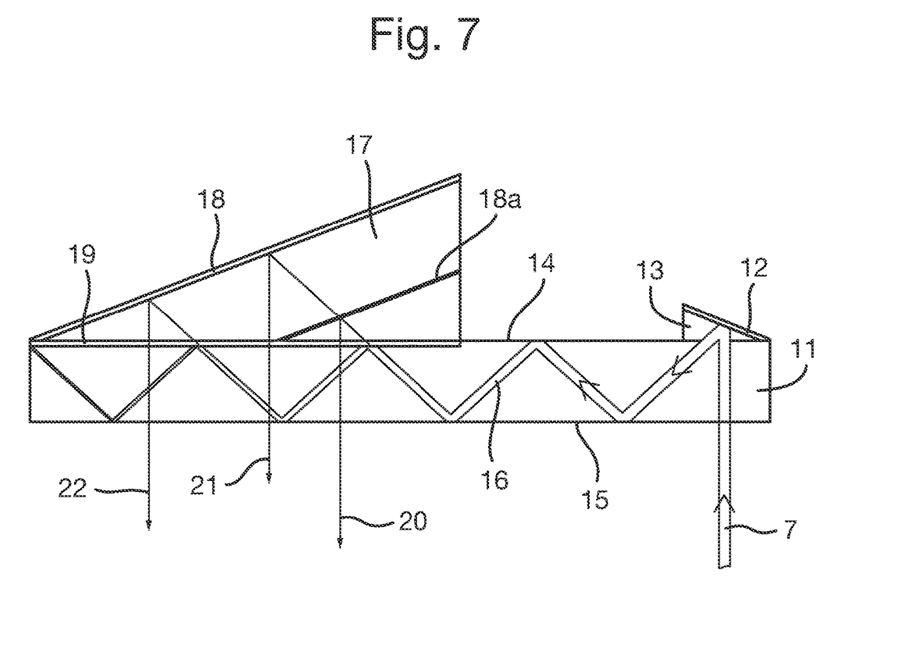
FIG. 7 shows an optical component for a display according to an embodiment of the invention.

FIGS. 2 and 7 schematically illustrate an optical component 10 providing a sub-assembly for a head-up display (HUD) or head/helmet mounted display (HMD) comprising an optical substrate 11 comprising a glass slab waveguide presenting two substantially parallel and opposed planar surfaces (14, 15) upon a common one of which surfaces 14 are mounted both an input prism unit 13 adjacent to one end of the slab waveguide, and an output prism unit 17 adjacent to the other end of the slab waveguide.

A hypotenuse of the input prism unit is inclined to the planar surface 14 of the slab waveguide upon which a base surface of the input prism unit is mounted, and bears a reflective coating 12 such as aluminium (Al) or a reflective dielectric coating which presents a reflective internal surface towards the slab waveguide.

Similarly, a hypotenuse of the output prism unit 17 is inclined to the planar surface 14 of the slab waveguide upon which a base surface of the output prism unit is mounted, and also bears a reflective coating 18 such as aluminium (Al) or a reflective dielectric coating which presents a reflective internal surface towards the slab waveguide. The output prism unit may, in some embodiments, such as shown in FIG. 7, also include a partial reflective (partially transmissive) surface (18a) embedded within it and which are positioned between an angularly reflective optical coating 19 (see below) and the reflective coating so as to present a partially reflective surface which is substantially plane parallel to the reflective coating. Additional, separate such partially reflective, embedded surfaces may be provided within the prism, and only one is shown in FIG. 7 for clarity.

A multi-layer angularly reflective optical coating 19 is formed between the base surface of the output prism unit and the facing parts of the planar surface 14 of the slab waveguide upon which the output prism unit is mounted. The angularly reflective optical coating 19 may be laid down on the top surface of the substrate 11. In this way, the multi-layer angularly reflective optical coating 19 is sandwiched between the whole of the interface between the output prism unit and the slab waveguide, such that the exchange of light between the output prism unit and the slab waveguide must take place via the multi-layer angularly reflective optical coating between them.

The inclination of the reflective hypotenuse surface 12 of the input prism unit is arranged such that an input light beam 7 incident upon the planar surface 15 of the slab waveguide 11 opposite to the waveguide surface 14 bearing the input prism unit, will be coupled into the slab waveguide for guiding 16 along the waveguide to the output prism unit.

In particular, the inclination is such that a light ray 7 input at an angle of incidence to the opposite planar surface 15 within a suitable angular range (measured relative to the normal to the surface, by convention) will pass transversely through the slab waveguide, through the base of the input prism unit, and onwards into the body of the prism unit to ultimately strike the reflective surface 12 on the hypotenuse of the prism unit. The inclination of the reflective surface is such as to re-direct the ray back through the body of the input prism unit, by reflection, to pass back through the base surface of the prism unit and onwards into the body of the slab waveguide so as to strike the opposite planar surface 15 internally at an angle of incidence sufficiently oblique to allow total internal reflection (TIR) at that surface and, subsequently at the opposing planar surface 14 (internally) of the slab waveguide to guide the light ray 16 towards the output prism unit 17. In this way the slab waveguide optically couples the input prism unit to the output prism unit.

Upon reaching the parts of the slab waveguide to which the output prism unit is attached, the guided light is able to interact with the angularly reflective optical coating 19 applied to the outer planar surface 14 of the waveguide between the waveguide and the base surface of the output prism unit. The guided light is guided along the slab waveguide by a series of successive TIR reflections alternately at each one of the two opposing surfaces (14, 15) of the waveguide. When such internal reflections occur at the internal surface parts 14 upon which the angularly reflective optical coating is formed, total internal reflection no longer occurs there but, rather, partial internal reflection from the surface and partial transmission through the angularly reflective optical coating occurs. The partial transmission of the angularly reflective optical coating may be spatially graded, so that, for example, 10% of incident light is transmitted to the output prism part at the regions of the coating closest to the input part 12, where the first ray/coating interactions occur, and as much as 50% is transmitted at the opposite end of the angularly reflective optical coating furthest from the input part where the last ray/coating interactions occur. This gradation of the transmission properties of the angularly reflective optical coating may be optimised to yield a uniform brightness at the user's eye across the image output region of the display apparatus. The angularly reflective optical coating may be provided (e.g. laid down) in the form of side-by-side, e.g. parallel, strips of coating. Each coating strip may have a different transmission property/degree selected in order to yield a uniform output image brightness at the user's eye as explained above.

The guided light, upon reaching the optically coated surface parts of the slab waveguide at the output prism unit, is no longer totally reflected internally. Some light from a given light ray is transmitted through the angularly reflective optical coating to the reflective surface of the output prism unit, while the remaining light is reflected back into the waveguide towards the opposing, surface 15 of the waveguide for TIR there and subsequent return to the angularly reflective optical coating further along the waveguide whereupon partial transmission/reflection occurs again, and so on. In this way, a controlled portion of the light of a guided ray may be output via the angularly reflective optical coating in successive interactions with the angularly reflective optical coating to expand the light of the ray in the longitudinal dimension of the waveguide. The opposing surface 15 of the waveguide part may be uncoated or may possess an anti-reflective coating upon its outer surface to assist in enhancing the image quality of the output image viewed through it by the user—i.e. to reduce surface glare.

The angle of inclination of the reflector of the input prism unit, relative to the opposed guiding surfaces (14, 15) of the slab waveguide, is chosen according to the value of the refractive index of the waveguide material and the smallest/extreme angles of the image rays such that the extreme angles of the image rays are captures by TIR within the waveguide part. For example, the refractive indices (n) of the prisms 13 and 17 and the substrate 11 may be chosen to be 1.805. The TIR angle for n=1.805 glass is 33.6 degrees. If a circular image with a FOV of 30° in air is to be injected into the waveguide, the smallest angle in the image is −15° (the image extends from −15° to +15° in air, and from −8.25° to +8.25° in a glass with a refractive index of 1.805). The ray at −8.25° thus has to undergo a total angular change of 41.85 degrees to TIR in the substrate at 33.6 degrees. The reflector 12 thus has may be preferably inclined at 20.925°.

The optical properties of the angularly reflective optical coating may be selected as desired to control the proportion of the light of a ray which is transmitted through the angularly reflective optical coating in this way, and the proportion that is reflected. Given that the ongoing guided light ray is increasingly diminished in intensity upon each successive partial reflection/transmission event at the optically coated waveguide surface, the angularly reflective optical coating may be arranged to vary in reflectivity in a longitudinal direction along the waveguide. That is to say, the reflectivity may fall, and the transmissivity may correspondingly increase, along the longitudinal direction of the waveguide such that a greater proportion of guided light is transmited through the angularly reflective optical coating for output at successive reflections as the guided light progresses along the waveguide. By balancing the greater proportion of transmission against the diminishing intensity of the guided beam, one may achieve multiple separate transmitted beam parts (20, 21, 22) of substantially the same light intensity. Each such beam part replicates the original guided beam.

The angularly reflective optical coating is a multi-stack coating comprising, for example, successive layers of $SiO_2$ and $TiO_2$. The coating may be designed so as to be only slightly transmissive to light passing from the waveguide into the output prism unit, while being substantially wholly, very or mostly transmissive to light travelling from the output prism unit into the waveguide.

In the example used above for a circular 30 degree FOV image injected into a waveguide with a refractive index of 1.805, the rays travelling from the prism 17 to the coating 19 will have undergone an angular change by reflection from the inclined reflector 18. These will be incident on the coating 19 within an angular range of +/−8.25°. Meanwhile, the rays waveguiding within the substrate 11 will be incident on the coating 19 within the angular range of 33.6° to 50.1°. This angular separation means that multi-layer dielectric coatings can be designed to have high transmission for the angular range +/−8.25° and high reflectance for the angular range 33.6° to 50.1°.

Multi-layer dielectric coating stack structures may comprise alternate layers of high and low refractive indices, typically 100 nm to 300 nm thick each, and there may be 12 to 50 layers, for example, depending on the angular and wavelength bandwidth of the required response.

The hypotenuse of the output prism unit is coated with a reflective material such as aluminium (Al) or a dielectric coating. Transmitted light emanating from the angularly reflective optical coating 19 between the waveguide and the output prism unit, is incident upon the reflective coating 18. The angle of inclination of the hypotenuse is such that the reflective coating/surface is arranged to reflect incident light back towards the angularly reflective optical coating and the slab of the waveguide at a sufficiently small angle of incidence that TIR is not allowed and the majority of the reflected light is transmitted directly through the angularly reflective optical coating and the opposing waveguide surfaces (14, 15) so as to appear as optical output rays (20, 21, 22) emanating from the same side 15 of the slab waveguide as the side into which the input light ray 7 was directed. Each output ray replicates the input ray, though is of lower intensity. The multiplicity of these replica output rays (20, 21, 22), arrayed along the longitudinal dimension of the slab waveguide serves to expand the input light along that dimension for viewing.

The angularly reflective optical coating 19 is designed to yield the required response which is matched for both S-polarised light and P-polarised light.

Figure 3:
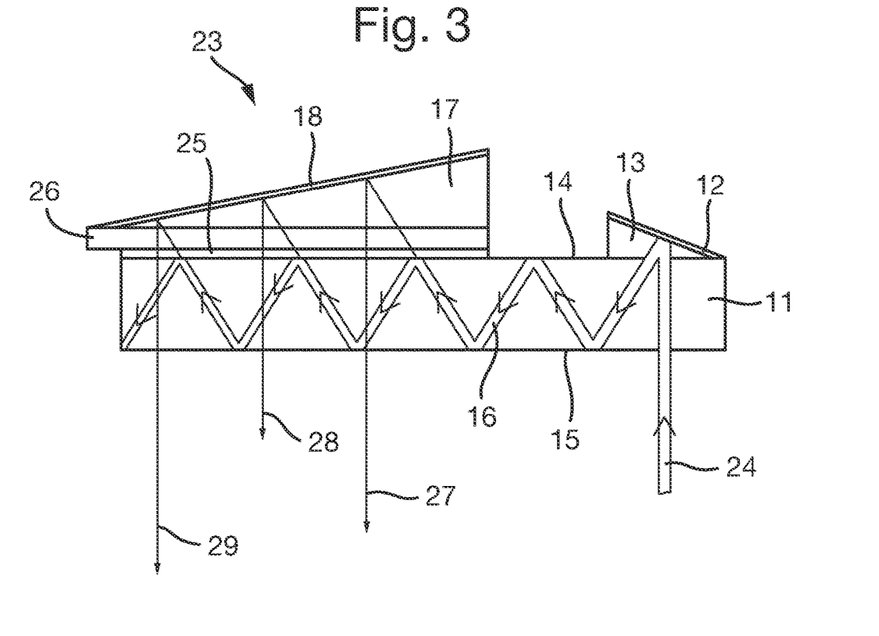
FIG. 3 shows an optical component for a display according to another embodiment of the invention including a quarter-wave plate.

FIG. 3 illustrates a variant of the optical component of FIG. 2. This embodiment of the invention incorporates the features of the embodiment illustrated in FIG. 2, and described above, but with the additional feature of a quarter-wave plate 26 positioned/sandwiched between an angularly reflective optical coating 25 and the base surface of the output prism unit 17. In particular, the quarter-wave plate comprises a substantially planar, optically transmissive plate presenting two plane parallel outer surfaces one of which is attached to, and across, the angularly reflective optical coating 25 formed upon the planar surface 14 of the slab waveguide, and the other of which is in attached to and across the base surface of the output prism unit.

The function of the quarter-wave plate, in common with quarter-wave plates in the art generally, is to apply a substantially 90-degree shift to the phase of component of the oscillating electric field of light transmitted through it. In being located between the angularly reflective optical coating and the base of the output prism unit, the quarter-wave plate is also positioned between the angularly reflective optical coating and the reflector 18 of the output prism unit. Consequently, a light ray transmitted through the angularly reflective optical coating towards the reflector of the output prism unit and subsequently reflected back from the reflector towards the angularly reflective optical coating again, for output through the slab waveguide, must pass through the body of the quarter-wave plate twice—once in each direction. Thus, two additive 90-degree phase shifts are applied to the light ray (i.e. 180-degree shift in total) between it leaving the angularly reflective optical coating and subsequently returning to it for output.

This 180-degree phase shift is such as to cause the orientation of the plane of oscillation (the polarisation plane) of the light transmitted light to change to an orientation which is perpendicular to the original polarisation orientation. Thus, if for example, incident light upon the quarter-wave plate is plane polarised in an orientation perpendicular to the plane of scattering of guided light within the waveguide (i.e. S-polarised light), then the finally output light—having undergone two transmissions through the quarter-wave plate—is plane polarised in an orientation parallel to the plane of scattering of guided light within the waveguide (i.e. P-polarised light). The angularly reflective optical coating 25 is arranged to provide the same function as is provided by the angularly reflective optical coating 19 arranged upon the slab waveguide according to the first embodiment illustrated in FIG. 1, and described above.

The angularly reflective optical coating 25 of the present embodiment may, indeed, be identical to the angularly reflective optical coating 19 of the first embodiment. However, the angularly reflective optical coating 25 of the present embodiment may be designed so as to be suitably reflective to incident light rays which are S-polarised yet highly transmissive to light rays which are P-polarised. This property may be provided by suitably structuring the angularly reflective optical coating and/or by use of suitable angularly reflective optical coating materials such as would be readily apparent to the skilled person.

See for example: "Design of a nonpolarizing beam splitter inside a glass cube" Applied Optics, Vol. 31 No. 25, page 5345 (1992), Authors: Gilo, Mordechai. See also for example: "High-performance thin-film polarizing beam splitter operating at angles greater than the critical angle", APPLIED OPTICS, Vol. 39, No. 16 page 2754 June(2000), Authors: Li Li and J. A. Dobrowolski.

The combination of this angularly reflective optical coating with the quarter-wave plate 26 of the optical component 23 shown in FIG. 3 thereby enables the beneficial use of S-polarised light rays 24 input onto the slab waveguide for guided propagation therealong and subsequent output. In particular, being preferentially reflective to S-polarised light, the input S-polarised light ray will, upon reaching the angularly reflective optical coating 25, be suitably highly (but not totally) internally reflected within the waveguide by the angularly reflective optical coating. The small proportion of the S-polarised light transmitted through the angularly reflective optical coating will be subsequently returned to the angularly reflective optical coating from the reflective hypotenuse of the output prism unit (via the quarter-wave plate) as P-polarised light which will be preferentially transmitted by the angularly reflective optical coating for output from the waveguide (e.g. for viewing). In this way, the quarter-wave plate, the output prism unit, and the polarisation-dependent properties of the angularly reflective optical coating 25 act in synergy to enable the efficient and controlled distribution of light from a suitably polarised guided light ray 16. Alternatively, the wave plate may be glued onto the hypotenuse of the prism 17 and then coated with a reflective coating to form reflector 18.

The optical component may form a part of a display apparatus arranged to provide the input light rays 24 in a suitable S-polarised state by filters or other means (not shown) readily available to the skilled person. Alternatively, the optical component 23 may include a polariser element (not shown) such as a polarising filter arranged at, upon or adjacent to the surface of the slab waveguide through which un-polarised light may be initially input to the waveguide in a direction towards the input prism unit. The polariser element may be arranged to transmit only those components of the un-polarised light corresponding to the polarisation axis of the polariser thereby to provide S-polarised light.

Figure 4:
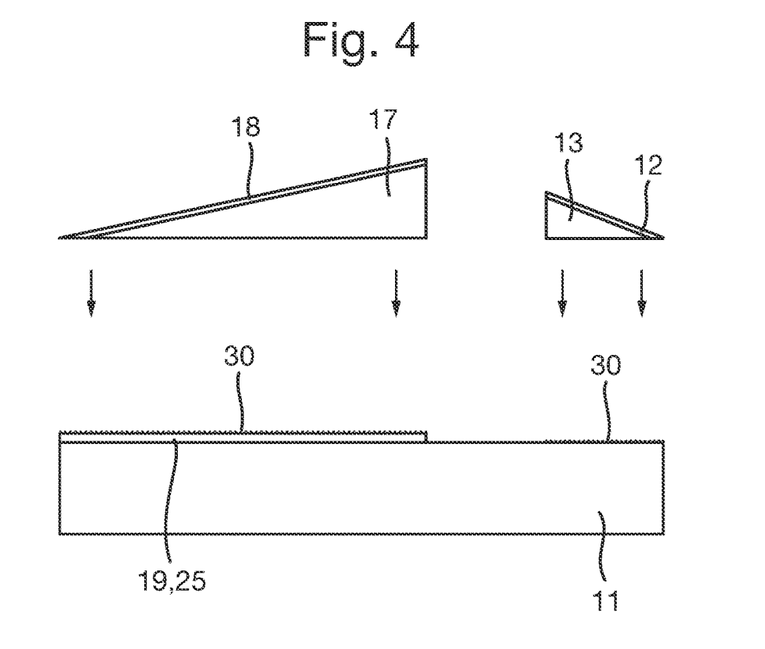
FIG. 4 shows an process for manufacturing an optical component for a display according to an embodiment of the invention.

FIG. 4 schematically shows the parts of the optical component 10 of FIG. 2, in exploded view to illustrate a method of manufacture of the component.

The method includes providing an optical waveguide slab substrate 11, and applying the partially transmissive angularly reflective optical coating (19, 25) upon a surface of the substrate at areas intended to receive guided light for output from the optical waveguide substrate. The method also includes providing an input prism unit 12 and an output prism unit 17, and coating a hypotenuse of each prism unit with a reflective coating (12, 18) for reflecting light internally within the respective prism unit.

Next, an optical glue or bonding agent 30 is applied to the exposed surface of the angularly reflective optical coating and also to a separate, uncoated part of the same planar side of the waveguide that bears the angularly reflective optical coating. The base surface of the input prism unit is then pressed to the glue-bearing uncoated part of the planar surface, and the output prism unit is also pressed to the glue-bearing surface of the angularly reflective optical coating to sandwich the latter between the prism unit and the optical substrate. The input prism unit is thereby optically coupled to the angularly reflective optical coating and the output prism unit via the slab substrate. In alternative embodiments a quarter-wave plate may first be attached to the angularly reflective optical coating in this way, and the base surface of the output prism unit is then glued to the exposed surface of the quarter-wave plate to cover the angularly reflective optical coating indirectly (see FIG. 3). In a yet further embodiment, the input prism unit may be glued to a side of the slab waveguide substrate opposite to the side bearing the output prism unit such that light may be input to the substrate via the same side as bears the output prism unit. The result would be that light would be output from a side of the waveguide substrate opposite to the side it was input to the waveguide substrate.

Figure 5:
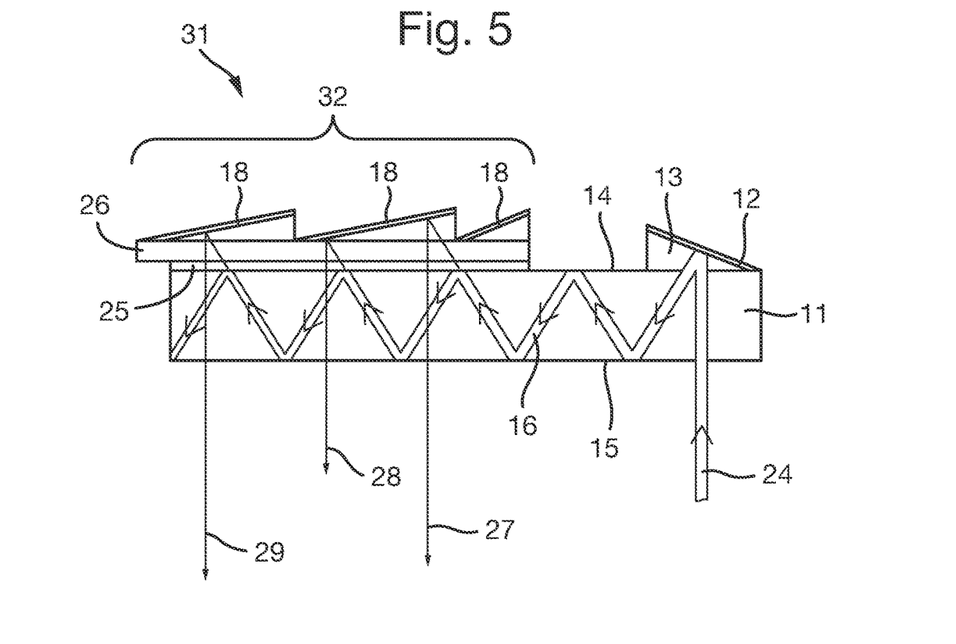
FIG. 5 shows an optical component for a display according to a further embodiment of the invention including a micro-prism array.

FIG. 5 schematically shows a further embodiment 31 of the invention which is a variant of the embodiment shown in FIG. 3. In this alternative embodiment, the output prism unit is replaced by an array of a plurality of small "micro-prisms" 32 which each cover a respective part of the quarter-wave plate 26 upon which the array is mounted and the angularly reflective optical coating 26 upon which the quarter-wave plate is mounted. Collectively, the micro-prisms cover the whole of the quarter-wave plate and the angularly reflective optical coating. The hypotenuse of each micro-prism is coated with a reflective coating such as aluminium (Al) or a reflective dielectric material. The angle of inclination of the hypotenuse of each micro-prism is substantially common to each. Thus, the micro-prism array 32 serves the same function as the single output prism unit 17 of FIG. 3 yet presents a smaller structure in that the hypotenuse of any one micro prism rises less than the hypotenuse of the single output prism unit. This reduces the overall size and weight of the optical component 31. It is noted that the input prism unit may also be replaced with a micro-prism array.

Figure 6:
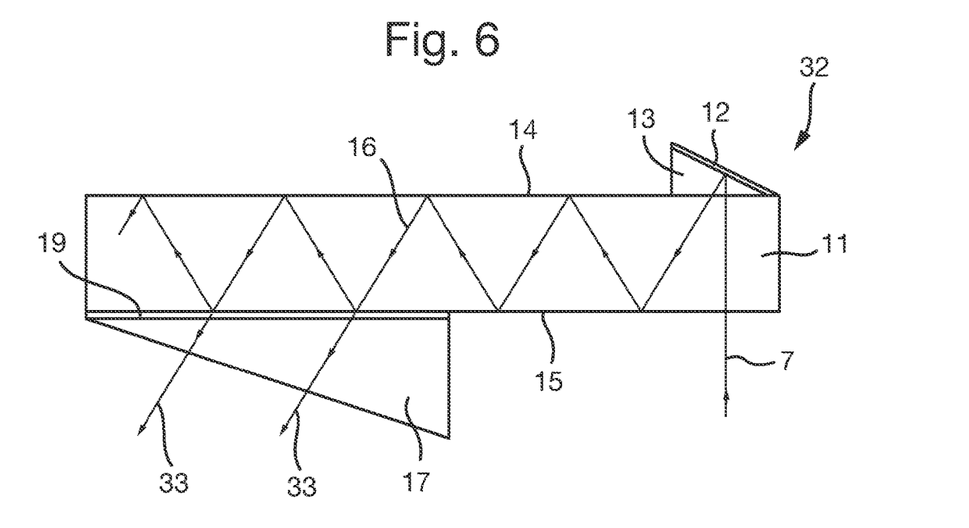
FIG. 6 shows an optical component for a display according to yet another embodiment of the invention in which the output part of the component does not employ a reflective surface, but is based on the principle of refraction.

FIG. 6 shows a further embodiment of the invention in which the hypotenuse of the output prism unit (or micro-prism array, if used instead) does not bear any reflective coating thereby enabling it to transmit light that is transmitted through the angularly reflective optical coating 19 arranged upon the slab waveguide surface between the output prism unit and the slab waveguide. Consequently, light need not be output from the optical component via reflection back through the angularly reflective optical coating and both planar surfaces of the slab waveguide, but may be directly output from the optically coated surface of the slab waveguide. The presence of the non-reflective hypotenuse of the output prism unit shown in FIG. 6 may serve to provide terminal output surface or boundary which is substantially perpendicular to the direction of the outgoing rays 33 such that further deviations of the rays by refraction at the boundary are reduced or suppressed. However, in yet further embodiments, the output prism unit 17 may be replaced by a simple planar transparent plate or other protective covering for the angularly reflective optical coating 19. The plate or covering may present a terminal outer surface which is substantially plane parallel to the planar surfaces of the waveguide. In the embodiment of the concept shown in FIG. 6, the input rays 7 may be refractively coupled into the waveguide 11 via the hypotenuse of the prism 13. In this case the reflective coating 13 would preferably be replaced by an anti-reflective coating to minimise light loss at the air/hypotenuse interface. The hypotenuse of prism 13 would preferably be inclined so that it is substantially perpendicular to the direction of the central rays of the input image rays 7. In order to cancel refractive dispersion, the hypotenuse of the output prism 17 would preferably be made parallel to the hypotenuse of the input prism 13.

The invention claimed is:

1. An optical component for a display apparatus comprising:
    an optical waveguide part arranged to guide light therealong between surface parts thereof by internal reflection thereat;
    an input part arranged to receive light and direct the received light into the optical waveguide part; and,
    an output part comprising:
        a partially transmissive angularly reflective optical coating arranged upon a said surface part of the optical waveguide part and optically coupled to the input part by the optical waveguide part to receive said guided light and to transmit a portion of said guided light out from the optical waveguide part, the angularly reflective optical coating configured to transmit more than reflect light incident upon the coating in a first angular range and reflect more than transmit light incident upon the coating in a second angular range, wherein angles in the second angular range of light are greater than angles in the first angular range of incident light; and
        a reflective coating inclined with respect to said surface part of the optical waveguide part and arranged to reflect said portion of said guided light back toward the angularly reflective optical coating and the optical waveguide part;
    wherein the angularly reflective optical coating extends along a dimension of the optical waveguide part to expand the guided light in said dimension along the output part by repeated partial transmission thereof for output.

2. An optical component according to claim 1 in which the output part includes a prism in optical contact with the said transmissive angularly reflective optical coating and arranged to receive light from the said waveguide part and to direct the received light out of the optical waveguide part.

3. An optical component according to claim 1 in which the reflective coating is arranged to receive said transmitted light from the angularly reflective optical coating and reflect the transmitted light in a direction through surface parts of the waveguide part for output such that the light transmitted from the angularly reflective optical coating to the reflective coating is incident upon the angularly reflective optical coating in the second angular range and the light reflected by the reflective coating is incident upon the angularly reflective optical coating in the first angular range.

4. An optical component according to claim 1 in which the refractive index of the angularly reflective optical coating at optical wavelengths is less than a refractive index of the waveguide part at corresponding optical wavelengths.

5. An optical component according to claim 1 in which the input part is arranged to direct light into the optical waveguide part to an angle of incidence sufficiently oblique to a said surface part as to totally internally reflect thereat wherein said angle of incidence is insufficiently oblique to totally internally reflect said light at said surface part along which said partially transmissive angularly reflective optical coating is arranged, thereby to enable transmission of some of said incident light therethrough.

6. An optical component according to claim 5 in which the input part comprises an input reflector part for receiving light through surface parts of the optical waveguide part and for reflecting said light into the optical waveguide part to an angle of incidence sufficiently oblique to a said surface part as to totally internally reflect thereat for guided propagation along the optical waveguide part.

7. An optical component according to claim 3 in which the output reflector part is arranged to direct light through surface parts of the optical waveguide part at an angle of incidence insufficiently oblique to totally internally reflect said light thereat.

8. An optical component according to claim 3 in which at least one of the output part and the input part each comprise a prism upon a surface of which is formed a reflective coating arranged to reflect light from the waveguide in a direction back through a surface part of the waveguide by reflection.

9. An optical component according to claim 3 in which the output part includes a quarter (¼) wave plate arranged between the angularly reflective optical coating and the output reflector part, the wave plate arranged to transmit light from the optical waveguide part to the output reflector part and from the output reflector part to the optical waveguide part.

10. A method of manufacturing an optical component for a display apparatus comprising:
providing an optical waveguide part including surface parts for guiding light therebetween by internal reflection thereat;
providing an input part to receive light and to direct the received light into the optical waveguide part;
applying a partially transmissive angularly reflective optical coating upon a said surface part to receive said guided light and to transmit a portion of said guided light out from the optical waveguide part, the angularly reflective optical coating configured to transmit more than reflect light incident upon the coating in a first angular range and reflect more than transmit light incident upon the coating in a second angular range, wherein angles in the second angular range of light are greater than angles in the first angular range of incident light; and
attaching an output part to the angularly reflective optical coating thereby optically coupling the output part to the angularly reflective optical coating, the output part for receiving transmitted light from the angularly reflective optical coating and outputting the light so received, the output part comprising a reflective coating inclined with respect to said surface part of the optical waveguide part and arranged to reflect said portion of said guided light back toward the angularly reflective optical coating and the optical waveguide part.

11. A method according to claim 10 in which the reflective coating is arranged to receive light transmitted from the angularly reflective optical coating and reflect the transmitted light in a direction through surface parts of the waveguide part for output such that the light transmitted from the angularly reflective optical coating to the reflective coating is incident upon the angularly reflective optical coating in the second angular range and the light reflected by the reflective coating is incident upon the angularly reflective optical coating in the first angular range.

12. A method of displaying an image comprising:
receiving light at an optical waveguide part and directing the received light into the optical waveguide part to guide light therealong between surface parts thereof by internal reflection thereat;
receiving said guided light at an output part of the optical waveguide part comprising a partially transmissive angularly reflective optical coating arranged upon a said surface part of the optical waveguide part, the angularly reflective optical coating configured to transmit more than reflect light incident upon the coating in a first angular range and reflect more than transmit light incident upon the coating in a second angular range, wherein angles in the second angular range of light are greater than angles in the first angular range of incident light;
transmitting a portion of said guided light out from the optical waveguide part through the angularly reflective optical coating, thereby expanding the guided light in a dimension of the optical waveguide part along which the angularly reflective optical coating extends by repeated partial transmission of guided light for output through the angularly reflective optical coating; and
reflecting said portion of said guided light back toward the angularly reflective optical coating and the optical waveguide part using a reflective coating inclined with respect to said surface part of the optical waveguide part.

13. A method according to claim 12 including receiving said transmitted light from the angularly reflective optical coating at the reflective coating and therewith reflecting the transmitted light in a direction through surface parts of the waveguide part for output such that the light transmitted from the angularly reflective optical coating to the reflective coating is incident upon the angularly reflective optical coating in the second angular range and the light reflected by the reflective coating is incident upon the angularly reflective optical coating in the first angular range.

14. A method according to claim 12 including receiving light through surface parts at an input reflector part and reflecting said light into the optical waveguide part to an angle of incidence sufficiently oblique to surface parts thereof as to totally internally reflect thereat for guided propagation therealong.

15. A method according to claim 12 including directing light into the optical waveguide part to an angle of incidence sufficiently oblique to said surface parts as to totally internally reflect thereat wherein said angle of incidence is insufficiently oblique to totally internally reflect said light at those parts of a said surface along which said partially transmissive angularly reflective optical coating is arranged, thereby to enable transmission of some of said incident light therethrough.

16. An optical component according to claim 2 in which the output part includes an output reflector part for receiving said transmitted light from the angularly reflective optical coating and reflecting the transmitted light in a direction through surface parts of the waveguide part for output.

17. An optical component according to claim 4 in which the input part is arranged to direct light into the optical waveguide part to an angle of incidence sufficiently oblique to a said surface part as to totally internally reflect thereat wherein said angle of incidence is insufficiently oblique to totally internally reflect said light at said surface part along which said partially transmissive angularly reflective optical coating is arranged, thereby to enable transmission of some of said incident light therethrough, and wherein the input part comprises an input reflector part for receiving light through surface parts of the optical waveguide part and for reflecting said light into the optical waveguide part to an angle of incidence sufficiently oblique to a said surface part as to totally internally reflect thereat for guided propagation along the optical waveguide part.

18. An optical component according to claim 6 in which the output reflector part is arranged to direct light through surface parts of the optical waveguide part at an angle of incidence insufficiently oblique to totally internally reflect said light thereat.

19. An optical component according to claim 7 in which at least one of the output part and the input part each comprise a prism upon a surface of which is formed a reflective coating arranged to reflect light from the waveguide in a direction back through a surface part of the waveguide by reflection.

20. An optical component according to claim 8 in which the output part includes a quarter (¼) wave plate arranged between the angularly reflective optical coating and the output reflector part, the wave plate arranged to transmit light from the optical waveguide part to the output reflector part and from the output reflector part to the optical waveguide part.

* * * * *